(12) United States Patent
Streng

(10) Patent No.: US 6,722,334 B2
(45) Date of Patent: Apr. 20, 2004

(54) METHOD AND DEVICE FOR AUTOMATIC STARTING OF A DIESEL ENGINE

(75) Inventor: Christoph Streng, Neckarsulm (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/216,182

(22) Filed: Aug. 12, 2002

(65) Prior Publication Data

US 2003/0037747 A1 Feb. 27, 2003

(30) Foreign Application Priority Data

Aug. 15, 2001 (DE) ......................... 101 38 997

(51) Int. Cl.$^7$ ............................. F02N 17/00
(52) U.S. Cl. ................ 123/179.3; 123/179.6; 123/179.17; 123/179.18
(58) Field of Search ............. 123/179.3, 179.6, 123/179.17, 179.18

(56) References Cited

U.S. PATENT DOCUMENTS 4,058,101 A * 11/1977 Taira et al. ............. 123/382
4,354,464 A * 10/1982 Fujita ..................... 123/179.18
4,474,009 A * 10/1984 Fried et al. ............. 123/179.18

FOREIGN PATENT DOCUMENTS

DE     38 35 214 C2     5/1989
DE    199 35 898 A1     2/2001

* cited by examiner

Primary Examiner—Henry C. Yuen
Assistant Examiner—Arnold Castro
(74) Attorney, Agent, or Firm—Stevens, Davis, Miller & Mosher, LLP

(57) ABSTRACT

The invention relates to a method and a device for automatic starting of a diesel engine, actuation of the ignition key (1) initiating preheating (2) and turnover of the engine by the starter (3) and fuel injection (4) being triggered at the earliest when the minimum temperature of the glow plugs (2') required for starting of the engine has been reached.

The object pursued is further development of the method and device so that duration and/or energy requirement for automatic starting is/are reduced. The object is attained in that, when the ignition key (1) is actuated, the throttle valve for delivery of air to the combustion chamber is also closed and is opened again at the earliest shortly before triggering of fuel injection (4). The device comprises a suitably designed control unit (6).

12 Claims, 1 Drawing Sheet

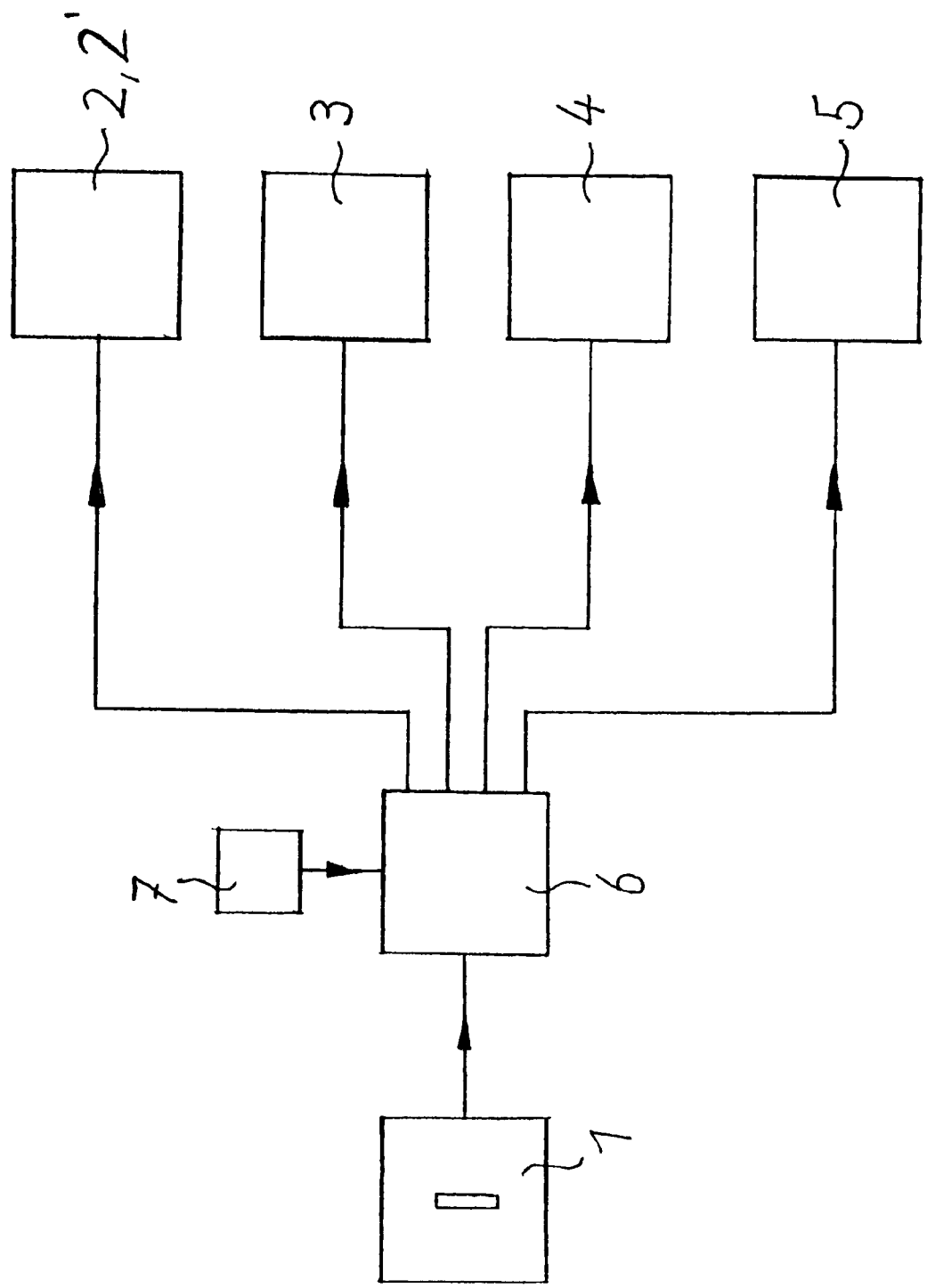

METHOD AND DEVICE FOR AUTOMATIC STARTING OF A DIESEL ENGINE

DESCRIPTION

The invention relates to a method for automatic starting of a diesel engine; when the ignition key is actuated, preheating and turning over of the engine by the starter are initiated and fuel injection is allowed only if the minimum temperature of the glow plugs required for starting the engine has been reached.

The invention also relates to a device for automatic starting of a diesel engine for application of a method such as that referred to above, with a control unit which may be activated by actuation of the ignition key, a device designed so that, when the ignition key is actuated, preheating and turnover of the engine by the starter are initiated and fuel injection is allowed only if the minimum temperature of the glow plugs required for starting the engine has been reached.

A method and device of the type referred to are disclosed in DE 38 35 214 C2. By means of the embodiments defined in this document automatic starting of a diesel engine is achieved in which the engine may be started without the need for waiting for completion of the preheat phase. Glow plugs of very high output and high-output batteries are required for generation of the high temperature in the shortest possible time.

The object of the invention is to reduce the time and/or energy required for the automatic starting.

Application of the method attains the object in that, when the ignition key is actuated, the throttle valve for delivery of air to the combustion chamber is also closed and is opened again at the earliest shortly before initiation of fuel injection.

With respect to the device the object is attained in that the control unit is designed so that, when the ignition key is actuated, the throttle valve for delivery of air to the combustion chamber also closes and is opened at the earliest shortly before initiation of fuel injection.

Application of the invention prevents cold air from striking the combustion chamber during preheating. As a result, the glow plug temperature required for starting of the engine is reached either more rapidly or with lower energy consumption. Hence this permits achievement of quicker starting of the engine, increase in the speed of starter rotation, and/or removal of the load on the battery in comparison to the conventional device. In addition, closing of the throttle valve causes less air to enter the engine, air which must be compressed needlessly during cranking of the engine in the first startup phase, that is before fuel injection.

The following developments of the method and the device serve the purpose of further optimization.

The method is preferably designed so that the beginning of the preheating and of starter initiation are separated in time so that the peak loads do not coincide chronologically. This prevents application of too great a peak load to the battery. Provision is suitably made such that actuation of the starter is delayed beyond beginning of the preheating so that the preheating peak load occurs before the starter peak load is applied. As a result, the very brief preheating period is lengthened somewhat.

Fuel injection occurs preferably at a point somewhat higher than the minimum temperature of the glow plugs, at a temperature optimal for ignition. The point in time selected for opening of the throttle valve, which is situated shortly before triggering of fuel injection, appropriately is such that optimal pressure and mixture relationships of air and fuel in the combustion chamber are achieved for ignition.

The device is correspondingly designed by configuring the control unit in such a way that or by providing it with a program such that the unit can cause the method steps in question to take place. It is also advisable for the control unit to be connected to a device for registering the temperature of the glow plugs. In this way reaching of the optimal temperature may be registered, even if the time at which such temperature is reached by the external temperature may be different under certain circumstances. The temperature may be registered directly with a temperature sensor. Since this is difficult, preference is given to indirect registration, for example, by way of the current consumption. The external temperature may also be registered and a waiting period may be determined as a function of it. In addition, the atmospheric pressure, which also exerts an influence, may be established and included in the method of determination of the waiting period. It is, of course, also possible to register other parameters and include them in control of the various elements of the device.

It is advisable to provide a quick-glow system for the preheating, one which because of its high output reaches the optimum temperature so quickly that the time required for starting the diesel engine no longer differs significantly from that needed for starting a gasoline-driven engine.

An exemplary embodiment of the device is presented in the drawing in diagrammatic form. An ignition lock 1 for actuation of the ignition key acts on a control unit 6, which is connected as prescribed to the glow plugs 2' for preheating 2, the starter 3, the fuel injection unit, and the throttle valve 5. Driving of these elements by the control unit 6 is carried out in the manner already described. It is also advisable, if a means for registering the glow plug temperature 7 is connected to the control unit 6, to register reaching of the optimal temperature and thereby enable the control unit 6 to carry out fuel injection 4 at the proper time. The control unit 6 may, of course, be connected to other sensors for registration of other parameters.

The invention exhibits only the essential features of the method and device; developments for differentiated allowance for other parameters in order to achieve additional optimization are naturally not excluded.

List of Reference Symbols

1. Ignition key actuation/ignition lock
2,2' Preheating/glow plug
3 Starter
4 Fuel injection
5 Throttle valve
6 Control unit
7 Device for registration of glow plug temperature

What is claimed is:

1. A method for automatic starting of a Diesel engine, preheating (2) and turnover of the engine by a starter (3) when an ignition key (1) is actuated and fuel injection (4) not being initiated until a minimum temperature (2') required for starting the engine has been reached, characterized in that,
   when the ignition key (1) is actuated, a throttle valve (5) for delivery of air to a combustion chamber also is closed and is not opened again until at the earliest shortly before triggering of fuel injection.
2. A method as defined in claim 1, wherein
   a beginning of preheating (2) and engagement of the starter (3) are separated in time so that peak currents are no longer synchronized.

3. A method as defined in claim 2, wherein starting of the starter (3) is delayed in relation to beginning of preheating (2) so that the preheating peak current occurs in advance of the starter peak current.

4. A method as defined in claim 3, wherein fuel injection (4) takes place when an optimum temperature of glow plugs (2') for ignition has been reached.

5. A method as defined in claim 3, wherein opening of the throttle valve (5) occurs at a point in time such that pressure and mixture proportions of air and fuel which are optimal for ignition in the combustion chamber are achieved by means of fuel injection.

6. A method as defined in claim 1, wherein fuel injection (4) takes place when an optimum temperature of glow plugs (2') for ignition has been reached.

7. A method as defined in claim 6, wherein opening of the throttle valve (5) occurs at a point in time such that pressure and mixture proportions of air and fuel which are optimal for ignition in the combustion chamber are achieved by means of fuel injection.

8. A method as defined in claim 1, wherein opening of the throttle valve (5) occurs at a point in time such that pressure and mixture proportions of air and fuel which are optimal for ignition in the combustion chamber are achieved by means of fuel injection.

9. A device for automatic starting of a diesel engine for application of a method as defined in claim 1 with a control unit which may be triggered by actuation of the ignition key (1), which control unit (6) is designed so that, when ignition key (1) is actuated preheating (2) and rotation of the engine by the starter is initiated and fuel injection (4) is triggered at the earliest when the minimum temperature of glow plugs (2') required for startup of the engine has been reached, characterized in that the control unit (6) is designed so that, when the ignition key (1) is actuated, the throttle valve (5) for delivery of air to the combustion chamber also is closed and is opened again at the earliest shortly before triggering of fuel injection (4).

10. A device as defined in claim 9, wherein the control unit (6) is connected to a device (7) for registration of the temperature of the glow plugs (2').

11. A device as defined in claim 10, wherein preheating (2) is effected by means of a quick-glow system.

12. A device as defined in claim 9, wherein preheating (2) is effected by means of a quick-glow system.

* * * * *